United States Patent [19]

Dombrowski et al.

[11] Patent Number: 4,598,584
[45] Date of Patent: Jul. 8, 1986

[54] ELECTRIC MEASURING CONVERTER FOR LEVEL

[75] Inventors: Ferdinand Dombrowski, Kaarst; Dieter Förster, Haan, both of Fed. Rep. of Germany

[73] Assignee: Sunvic Regler GmbH, Solingen, Fed. Rep. of Germany

[21] Appl. No.: 764,501

[22] Filed: Aug. 6, 1985

Related U.S. Application Data

[63] Continuation of Ser. No. 572,094, Jan. 19, 1984, abandoned, which is a continuation-in-part of Ser. No. 459,172, Jan. 19, 1983, abandoned.

[30] Foreign Application Priority Data

Jan. 20, 1983 [EP] European Pat. Off. ............ 83100455
Jan. 30, 1982 [DE] Fed. Rep. of Germany ....... 3203110

[51] Int. Cl.⁴ ............................................. G01F 23/38
[52] U.S. Cl. .................... 73/308; 73/DIG. 3
[58] Field of Search .................. 73/308, 313, DIG. 3, 73/DIG. 5; 310/DIG. 3; 324/235; 338/32 R, 32 H

[56] References Cited

U.S. PATENT DOCUMENTS 2,599,550  6/1952  Fraser .............................. 338/32 R
3,444,731  1/1967  Nieuweboer .................. 73/DIG. 3

FOREIGN PATENT DOCUMENTS 904423   7/1972  Canada ........................ 310/DIG. 3
528759   6/1931  Fed. Rep. of Germany ........ 73/313
2627865  1/1978  Fed. Rep. of Germany ........ 73/308
0040585  3/1979  Japan ................. 338/32 H

OTHER PUBLICATIONS

Oppenheimer, Michael, "In IC form, Hall-Effect Devices, . . . ", *Electronics*, Aug. 2, 1971, pp. 46–50.
Doyle, Owen, "Other Hall Makers", *Electronics*, Aug. 2, 1971, p. 49.

*Primary Examiner*—Charles Frankfort
*Assistant Examiner*—W. Morris Worth
*Attorney, Agent, or Firm*—Marshall, O'Toole, Gerstein, Murray & Bicknell

[57] ABSTRACT

An electric signal in an electrical level measuring transducer shall be generated in an explosion-proof manner, which continuously depends on the level in the interior of a container. The buoyancy of a float 14 is converted into a movement of a permanent magnet 36. The permanent magnet moves in the area of a Hall generator 44. The signal processing elements 48 are disposed in a tightly closed housing in explosion-proof manner. The Hall generator 44 is located in a non-magnetic part of the wall 38 of the housing 20.

4 Claims, 9 Drawing Figures

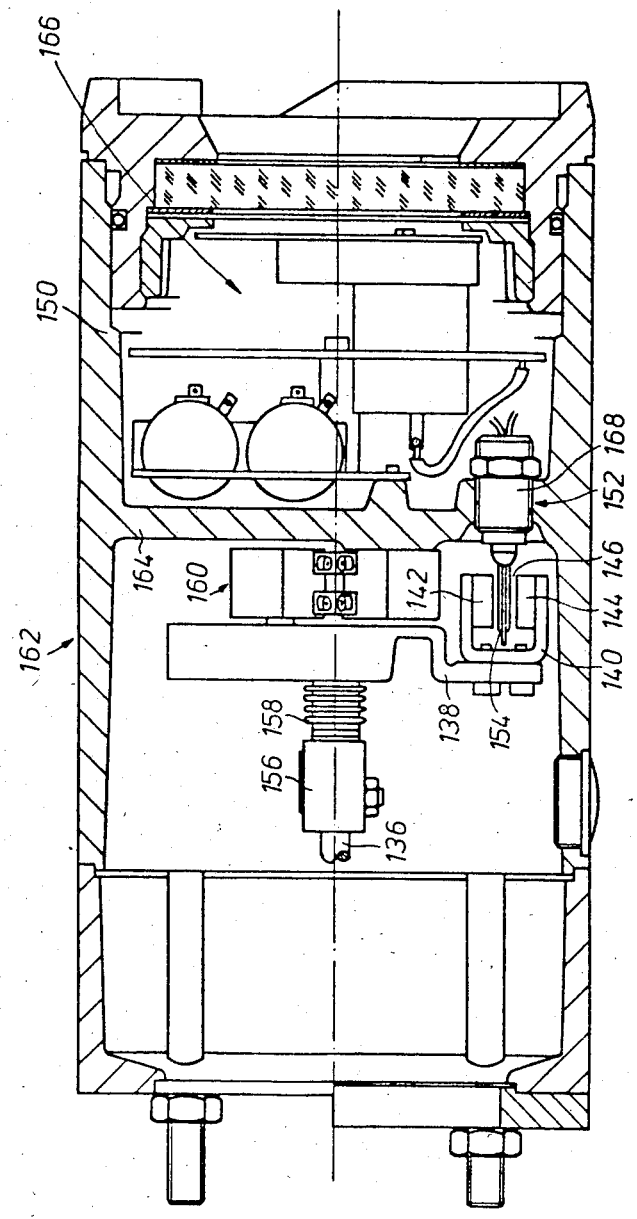

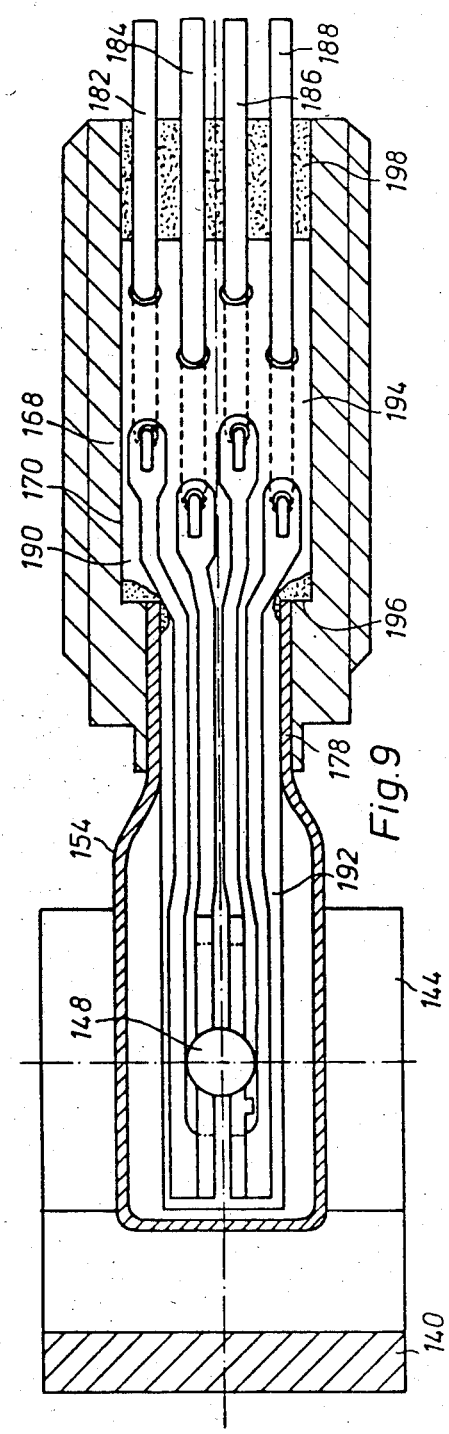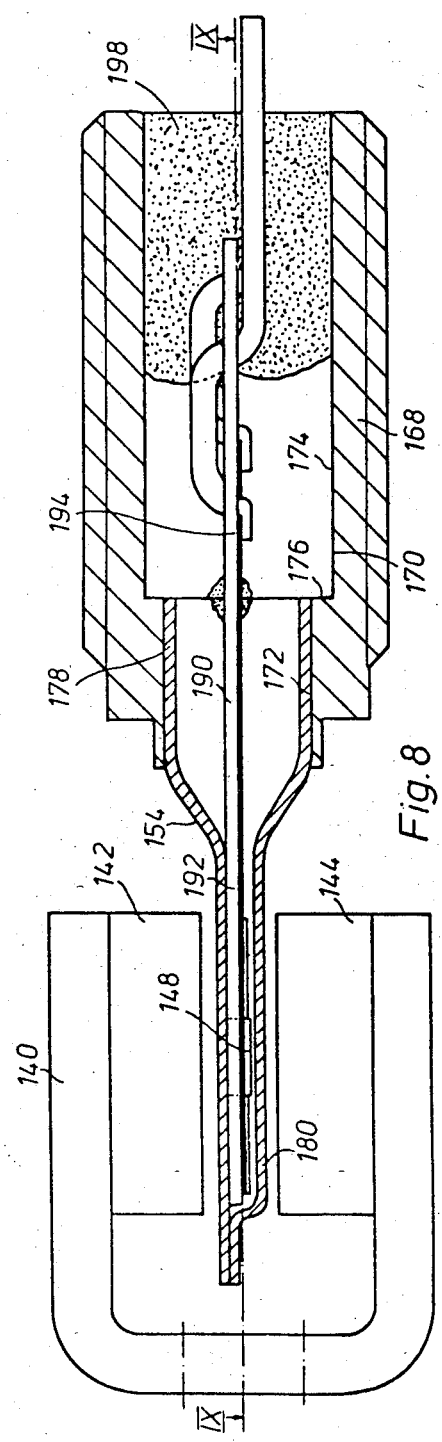
Fig. 9
Fig. 8

ELECTRIC MEASURING CONVERTER FOR LEVEL

This application is a continuation of application Ser. No. 572,094, filed Jan. 19, 1984, abandoned, which is a continuation-in-part of application Ser. No. 459,172, filed Jan. 19, 1983 abandoned.

The invention relates to an electric measuring converter for level for generating a signal representing the level inside a container, comprising
(a) a float disposed in the interior of the container,
(b) means for converting the buoyancy acting upon the float into a movement and
(c) means for converting this movement into an electric signal.

In a prior art measuring converter of this type (German Offenlegungsschrift No. 26 27 556), a bending body clamped on one side to a base body and carrying strain gages is provided as movement converting means. The buoyancy converting means comprise a pivotable lever which is pivoted on the base body and connected to the free end of the bending body, and upon which the buoyancy is acting to flex the bending body. To this end, a two-armed force transmitting lever is provided which is connected to a stiff diaphragm in the middle. This diaphragm in mounted in a housing flange and forms the pivot of the force transmitting lever. A float on which buoyancy will act is attached to the arm of the force transmitting lever projecting into a container. A thrust piece is guided for longitudinal movement on the other arm of the force transmitting lever, which thrust piece engages the pivotable lever non-positively.

A measuring converter having strain gages is expensive. Additionally, problems of the protection against explosion may arise requiring additional and expensive measures.

From DE-AS No. 26.27.253, a level signal transmitter is known in which a disc-shaped flange is adapted to be attached to a container, which flange closes an aperture in the container wall. At least partly, the flange is made of non-magnetic material. On its inside, it has a pair of bearing supports extenting perpendicular with respect to the flange. A two-armed lever is pivoted, between the bearing supports. The two-armed lever carries a float on its end remote from the flange, and a magnet on its flange end. A reed-switch comprising a vessel filled with inert gas is disposed in a radial bore of the flange and is adapted to be actuated by the magnet through the non-magnetic material.

Such a level signal transmitter supplies a yes-no-signal only, that means, it only indicates whether a given level has been exceeded or not.

It is the object of the invention to provide a simple and inexpensive electric measuring converter for level which supplies a continuous level signal.

According to the invention, this object is achieved in that
(d) a permanent magnet means is arranged to be moved by the buoyancy converting means and
(e) the movement converting means comprise a Hall generator in the area of movement of the permanent magnet means for generating the electric signal.

The Hall generator supplies an electric signal continuously varying in accordance with the movement of the permanent magnet means.

When using a Hall generator, an embodiment protected against explosion may be obtained in a simple way in that
(a) signal processing means are disposed in a tightly closed housing and
(b) the Hall generator is located in a non-magnetic part of the wall of the housing.

The problem is not that of transmission out of the container to the measuring converter. This may be solved in a different way, for example as disclosed in German Offenlegungsschrift No. 26 27 556. The problem is neither that of accumulation of moisture in the housing in case of temperature variation, with which German Auslegeschrift No. 26 27 253 is concerned above all. It is essential here that a movement, which is caused by the buoyancy and has already been transmitted out of the container, is converted into a continuous electric signal in explosion-proof manner.

Hall generators of the type used here are known per se, for example from German Offenlegungsschrift No. 30 13 857, which, however, refers to a mechanic-electric pressure converter.

Two embodiments of the invention will be described in greater detail hereinbelow with reference to the accompanying drawings.

FIG. 7 is a vertical view similar to FIG. 2 of a constructional design of the modified measuring converter.

FIG. 8 shows a side elevation, partly in section, of the magnets and the Hall generator.

FIG. 9 is a sectional view taken along line IX—IX of FIG. 8.

Figure 1:
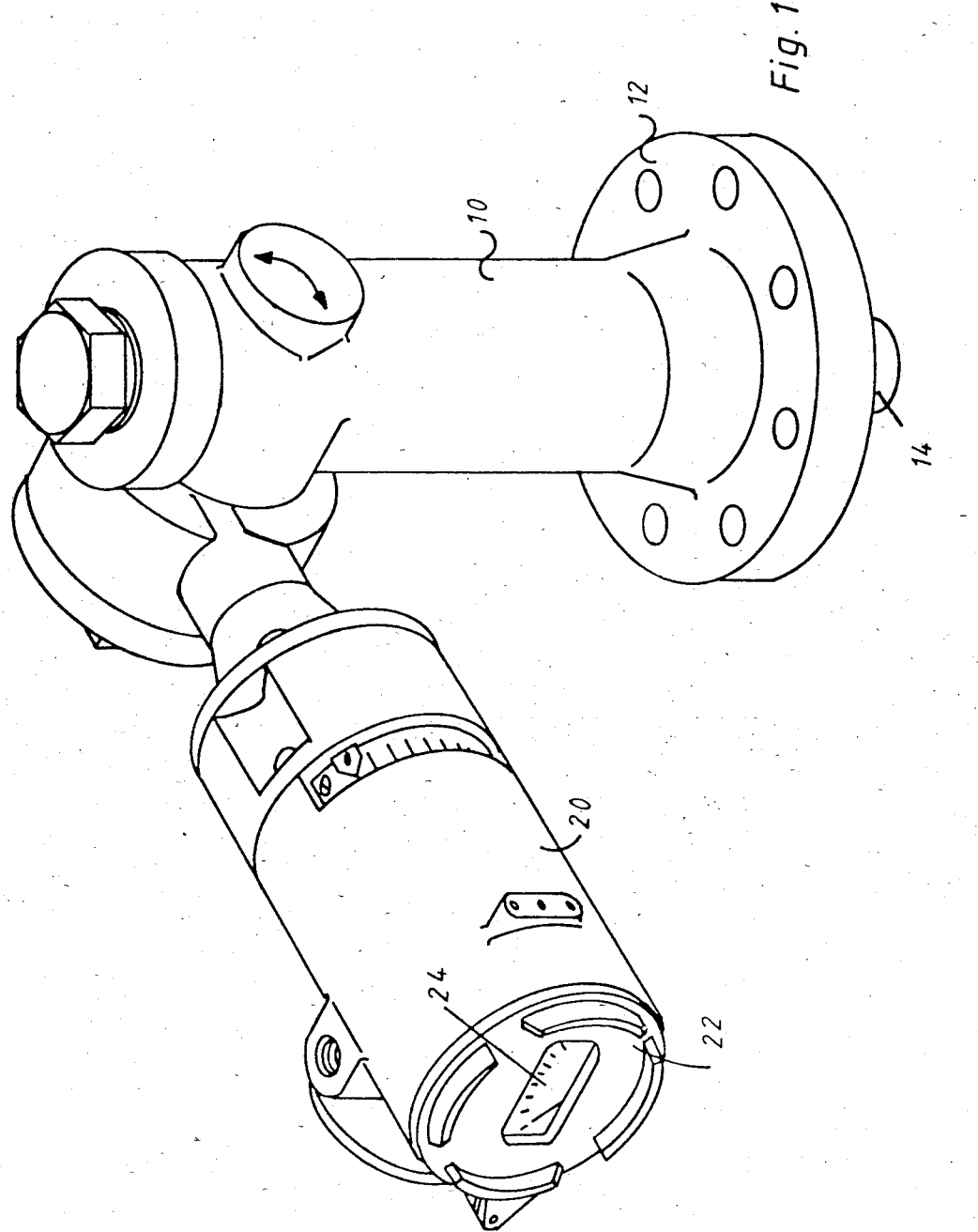
FIG. 1 is a perspective view of an electric measuring converter for level.

The measuring converter for level comprises a vertical cylinder 10 closed at the top, which has a flange 12 tightly screwed by means of threaded bolts to a container to be monitored. In the cylinder 10, a float 14 is suspended vertically movably. The float 14 is suspended from a lever extending transverse to the axis of the cylinder 10, which lever is rotated with the up and down movement of the float 14 caused by the buoyancy. This rotating movement is transformed into a rotating movement of a rod 16. This rotation is transmitted out of the chamber under pressure of the container by means of a torsion tube 18. This design is known per se and therefore is not described in detail here.

The rod 16 coaxially projects into a substantially cylindrical housing 20. The axis of the housing 20 extends substantially horizontally and laterally offset relative to the axis of the vertical cylinder 10. On the end face 22 of the housing 20, an indicating instrument 24 for the level is visible.

Figure 2:
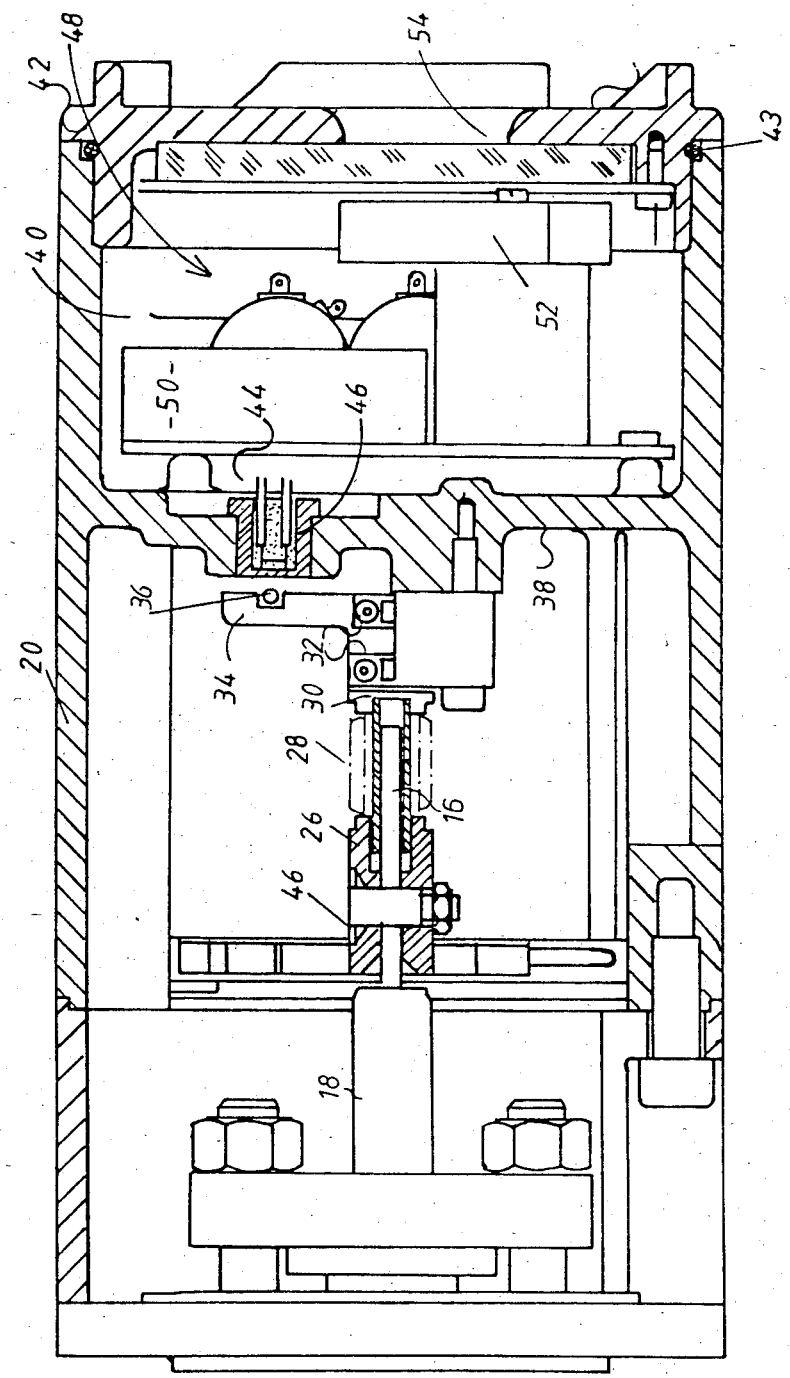
FIG. 2 shows a vertical, sectional view of the measuring converter.

As can be seen from FIG. 2, a block 26 is provided on the rod 16. The block 26 is connected to a hub portion 30 through a bellows 28. The hub portion 30 is mounted for limited rotation, for example by leaf springs 32. The bellows 28 is substantially rigid against torsion and therefore transmits rotation. It permits, however, the compensation of axial tolerances and of misalignments. The hub portion 30 carries an arm 34. A permanent magnet 36 is attached to the arm 34.

The housing 20 is divided by a partition 38 and defines a chamber 40 closed by a cap 42. Sealing between cap 42 and housing 20 is effected by O-rings 43. A Hall generator 44 is located in the partition 38. The Hall generator 44 is embedded in a plug-like plastic part 46, which is threaded into a threaded bore of the partition 38. The electric signal processing means 48 are disposed in the chamber 40.

Figure 3:
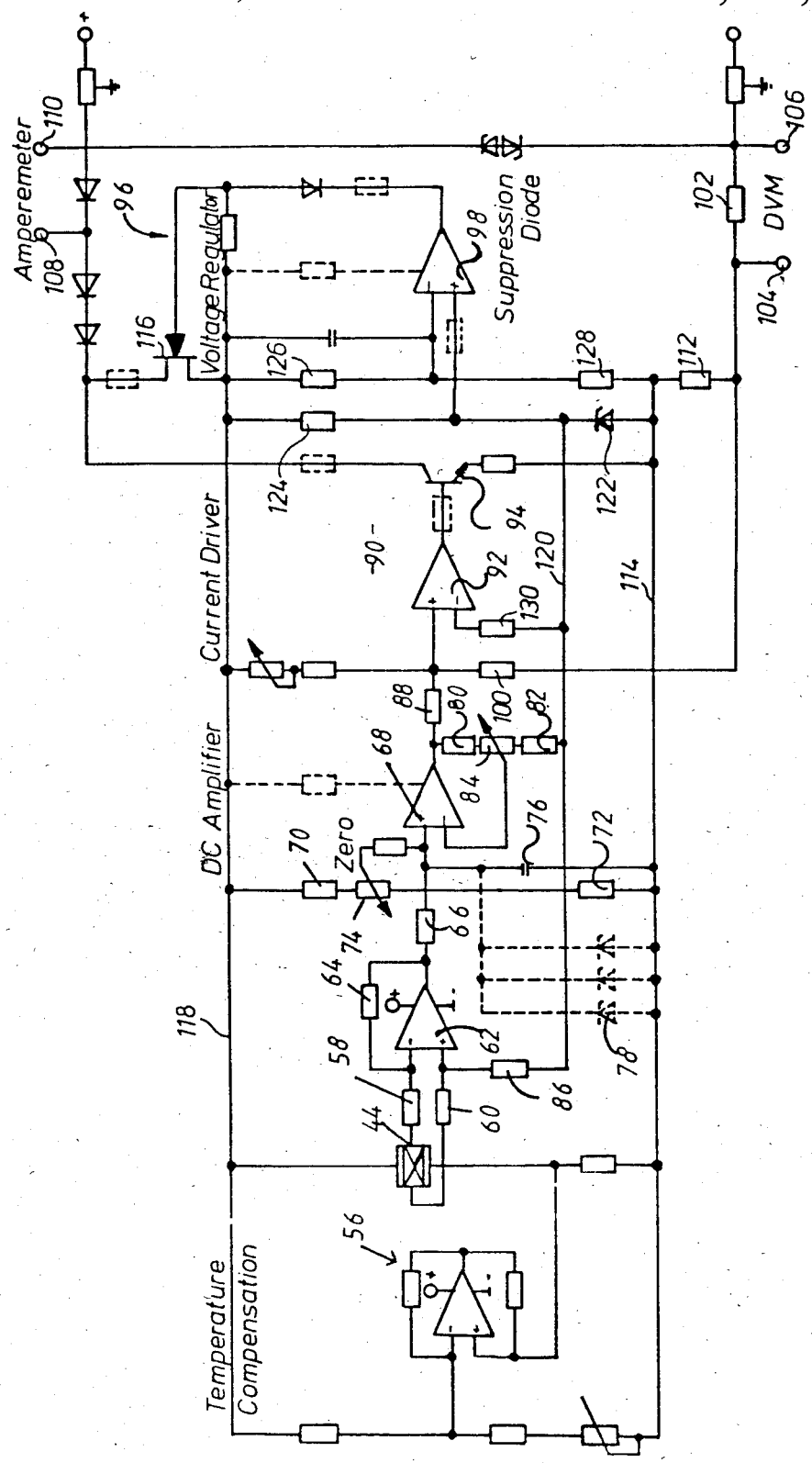
FIG. 3 is a wiring diagram of the measuring converter.

The signal processing means 48 comprise the circuit arrangement 50 constructed as hybrid circuit, which is illustrated in detail in FIG. 3, and an indicating instrument 52 in the form of an ammeter. The housing 20 has a transparent window 54 on the end face 22. The indicating instrument 52 serving to indicate the signal produced by the signal processing means 48 is disposed behind this window 54 in the housing 20.

During rotation of the rod 16, the permanent magnet 36 moves relative to the Hall generator 44. Thereby, the output voltage thereof changes in a relatively large range substantially linearly with the rotation of the rod 16 and thus with the displacement of the float 14.

As illustrated in FIG. 3, the circuit arrangement 50 contains the Hall generator 44. The current flowing through the Hall generator 44 is compensated for temperature variations by means of a temperature compensation circuit 56. A Hall voltage is generated across the Hall generator and is applied to the two inputs of an operational amplifier through resistors 58,60. A negative feedback from the output of the operational amplifier 62 to its inverting input is effected through a resistor 64.

The output signal of the operational amplifier 62 is applied to the non-inverting input of an operational amplifier 68 through a resistor 66. In addition, a balancing voltage for the zero balance, which is derived from the supply voltage by means of a voltage divider having fixed resistors 70,72 and a potentiometer 74, is applied to this non-inverting input. Furthermore, a capacitor 76 is connected to the non-inverting input of the operational amplifier 68, to which capacitor Zener diodes 78 are connected in parallel.

The output of the operational amplifier 68 is fed back to the inverting input of the operational amplifier 68 through a voltage divider having fixed resistors 80,82 and a potentiometer 84.

Furthermore the output from the operational amplifier 68 is connected through a resistor 88 and through the resistors 100 and 102 to the negative voltage source terminal (—). An output voltage is tapped across resistor 102 through terminals 104,106 and is supplied, for example, to a digital voltmeter for display of level.

The output of the operational amplifier 68 through a resistor 88 controls a driver 90 comprising an operational amplifier 92 and a transistor 94. The driver 90 feeds the indicating instrument 52 designed as ammeter.

Numeral 96 designates a conventional voltage regulator.

A voltage source is connected to terminals "+" and "—". The negative voltage source terminal "—" is connected to a conductor 114 through a resistor 112. The positive voltage source terminal "+" is connected to a conductor 118 through a FET 116 serving as controllable impedance. A conductor 120 is connected to conductor 114 through a Zener diode 122 and to conductor 118 through a resistor 124. The Zener diode 122 provides a reference voltage at a non-inverting input of a control amplifier 98.

The inverting input of the control amplifier 98 has applied thereto a partial voltage of the voltage between conductors 118 and 114, said partial voltage being tapped from a voltage divider with resistors 126,128. The output voltage of the control amplifier 98 controls the FET 116. When the voltage between conductors 118 and 114 deviates from a setpoint, the partial voltage from the voltage divider 126,128 will deviate from the reference voltage provided by the Zener diode 122. Thereby the impedance of the FET 116 is changed. In this way, the voltage between the conductors 118 and 114 is kept at a constant value. The circuits of the operational amplifiers 62,68 and 92 are connected between these conductors 118, 120. The non-inverting input of the operational amplifier 62 is connected to the conductor 120 through a resistor 86. The output of the operational amplifier 68 is connected to the conductor 120 through the voltage divider 80,84,82. Furthermore the inverting input of the operational amplifier 92 is connected to the conductor 120 through a resistor 130.

Figure 4:
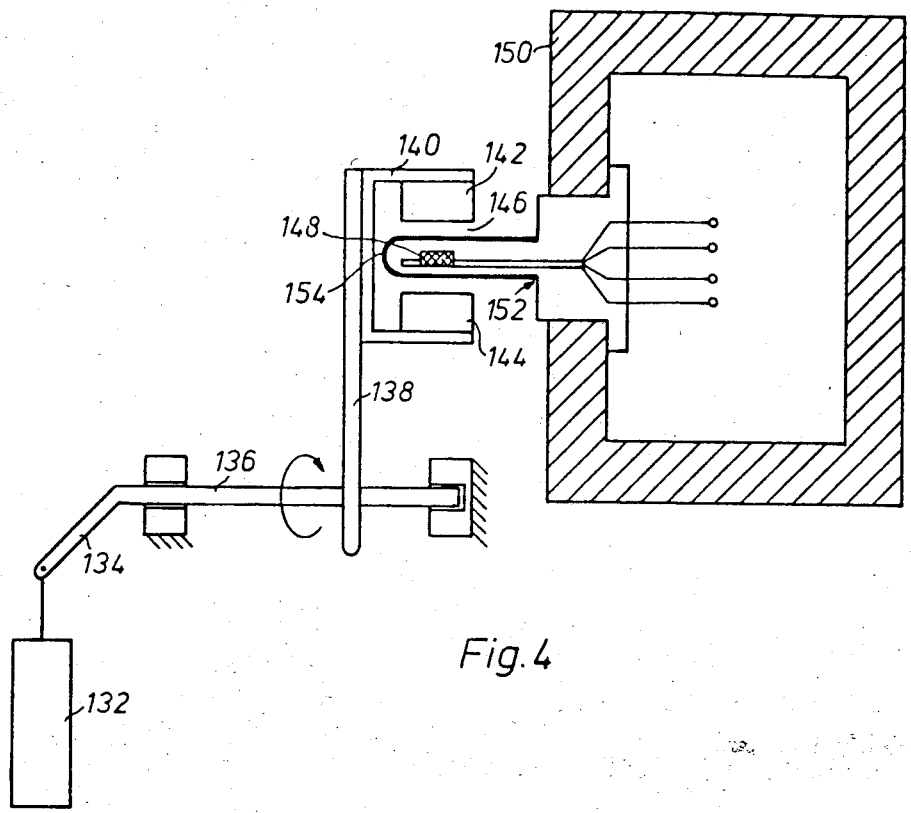
FIG. 4 is a schematic illustration of a modification of the measuring converter.

A modification is illustrated in FIGS. 4 to 9. FIG. 4, at first, illustrates the modification schematically.

Figure 5:
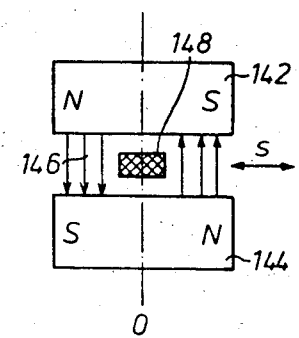
FIG. 5 is a schematic illustration of the magnet assembly of the embodiment of FIG. 4.
Figure 6:
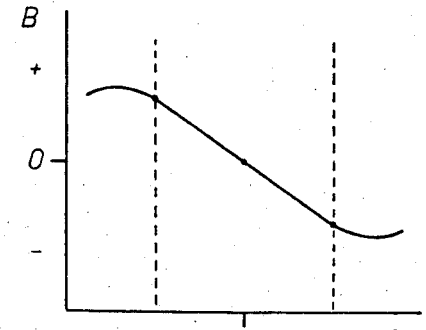
FIG. 6 shows the variation of the flux density B effective on the Hall generator as a function of the displacement $s$ of the permanent magnets.

Numeral 132 in FIG. 4 designates a float, which is suspended from a lever 134 in a container. The lever is attached radially to a rotatably mounted shaft or rod 136. Any displacement of the float 132 causes the rod 136 to rotate. A radial arm 138 is attached to the rod 136. The arm 138 carries a u-shaped yoke as a holder for permanent magnet means. The two legs of the yoke, which extend axially, carry one permanent magnet each 142 and 144, respectively. The relative arrangement of the permanent magnets 142 and 144 is illustrated in FIG. 5, which is a view from the right in FIG. 4. The permanent magnets 142 and 144 are secured to the holder 140 and spaced to define an air gap 146 therebetween. The arrangement of the permanent magnets 142,144 is such that, at a first end (on the lefthand side in FIG. 5) the North pole of one permanent magnet 142 is opposite the South pole of the other permanent magnet 144, and at a second end (on the righthand side in FIG. 5) the South pole of said one permanent magnet 142 is opposite the North pole of said other permanent magnet 144. The permanent magnet means are arranged to be moved over the Hall generator 148 with their air gap 146 defined between the permanent magnets 142,144, when the rod 136 is rotated and thus the arm 138 is pivoted. The movement is in the direction of the double arrow s in FIG. 5, i.e. in the direction from said first end to said second end or vice versa. Then a flux density B as a function of displacement s as shown in FIG. 6 results at the location of the Hall generator. It will be noted that this function is very linear over a rather large range between the dashed lines. In the centre, the flux density is zero. Relatively high flux densities and thus relatively high signals at the Hall generator are achieved as compared to the embodiment of FIG. 2. Because of the increased signals, temperature-dependent zero drift of the Hall generator has less weight.

Also with the modification signal processing means are arranged in a tightly sealed housing 150. The Hall generator 148 is located in a non-magnetic wall portion 152 of the housing 150. The non-magnetic wall portion 152 forms a hollow body 154 protruding outwards from the wall of the sealed housing, the Hall generator 148 being arranged in said hollow body. This protruding hollow body 154 extends into the air gap 146 of the permanent magnet means described. The wiring diagram of the Hall generator 148 and of the signal processing means is identical with that of FIG. 3.

FIGS. 7 to 9 show the constructional details of the modification.

The motion is transmitted out of the container, in which the level is to be measured, in similar manner as illustrated in FIGS. 1 and 2, namely by means of a torsion tube, which permits rotary motion of the rod 136. A block 156 is attached to the rod 136. The block 156 is connected to the hub of arm 138 through a bellows 158. The arm 138 is mounted for limited rotation, for example through a leaf spring assembly 160. The bellows 158 is substantially torsionally rigid and therefore transmits rotary movements. It permits, however, compensation for axial tolerances and misalignment.

Numeral 162 designates a measuring converter housing. The measuring converter housing 162 is subdivided by a partition 164. The partition 164 and the portion of the measuring converter housing at the righthand side thereof form the sealed housing 150 of FIG. 4, which contains the signal processing means 166. The arrangement is similar to FIG. 2.

In FIG. 7 the arm 138 carries the permanent magnet means which have already been described with reference to FIGS. 4 and 5. Corresponding elements bear the same reference numerals in FIG. 7 and in FIGS. 4 and 5. The non-magnetic wall portion 152 is located in partition 164 and is described in greater detail with reference to FIGS. 8 and 9.

As has been described already with reference to FIG. 4, the non-magnetic wall portion 152 comprises a hollow body 154 protruding axially outwardly from the wall 164 of the sealed housing, the Hall generator 148 being arranged in said hollow body. The hollow body 154 extends into the air gap 146 of the permanent magnet means. A threaded sleeve 168 having a stepped bore 170 is screwed into the wall 164 of the sealed housing 150. A relatively narrow section 172 of the bore 170 passes through the outer (with respect to the housing 150) end of the threaded sleeve 168 and forms a shoulder 176 with a relatively wide, inner section 174. The hollow body 154 has a substantially cylindrical neck portion 178 open towards the interior of the sealed housing 150, and a flattened, closed end 180. The cylindrical neck portion 178 of the hollow body 154 is inserted sealingly into the relatively narrow section 172. The Hall generator 148 with its connecting conductors 182,184,186,188 is mounted on a flat carrier 190. The connecting conductors on the outer portion of the carrier are made by printed circuit technique. The Hall generator 148 with this flat carrier 190 is pushed into the flattened end 180 of the hollow body 154. The flat carrier 190 has a narrow front portion 192 carrying the Hall generator 148, and a wider, rear portion 194, steps 196 being formed on both sides between these portions. When the carrier 190 has been inserted into the threaded sleeve 168 and the hollow body 154, the steps 196 engage the shoulder 176 of the bore 170.

Thereby the Hall generator 148 assumes a well defined position within the hollow body 154. After the carrier 190 has been inserted, the relatively wide section 174 of the bore 170 is compound-filled with some casting compound.

We claim:

1. In an electrical level measuring transducer for generating an electric signal representing the instantaneous liquid level of a substance inside a container, including a float disposed inside the container moving in response to changes in the liquid level, and means for converting the float movement into said electric signal, including permanent magnet means adapted to be moved by the float movement and a Hall generator adjacent the permanent magnet means for generating the electric signal, the improvement comprising:

the permanent magnet means including a pair of permanent bar magnets mounted adjacent to each other in a parallel arrangement to define a uniform coextensive air gap therebetween, with a first end of the air gap having the North pole of one permanent bar magnet adjacent the South pole of the other permanent bar magnet and a second end of the air gap having the South pole of the one permanent bar magnet adjacent the North pole of the other permanent bar magnet, to thereby form a linearly varying distribution of magnetic flux density B between the first and second ends of the air gap;

a tightly closed housing located adjacent the pair of permanent magnets, the housing having walls to substantially seal the housing interior from the environment;

a non-magnetic wall portion in one of the housing walls facing the pair of permanent magnets, including an elongated hollow body protruding outwardly from the wall with a closed end in the air gap between the pair of permanent magnets;

mounting means for mounting the Hall generator within the elongated hollow body and at the closed end thereof to enable the pair of permanent bar magnets, in response to the float movement, to be displaceably moved over the Hall generator in a range of displacement with respect to the Hall generator defined from the first end of the air gap to the second end of the air gap or vice versa, and wherein the electric signal representing the instantaneous liquid level is generated in the elongated hollow body by the Hall generator; and said pair of permanent magnet means providing a linearly varying distribution of magnetic flux density B over said range of displacement of the magnets over the Hall generator between the first and second ends of the air gap to enable a continuous linearity in said electric signal to be obtained for measuring the instantaneous level of liquid inside the container.

2. An electrical level measuring transducer according to claim 1, wherein the elongated hollow body closed end is flattened and the hollow body has a substantially cylindrical neck portion open towards the wall, and wherein the mounting means includes a flat carrier insertable through the opened neck portion and into the flattened, closed end of the hollow body with the Hall generator mounted therein.

3. An electrical level measuring transducer according to claim 2, wherein the mounting means includes a sleeve threadably mounted into the wall at the non-magnetic wall portion and having a stepped bore formed by an outer bore section of narrow diameter and an inner bore section of wider diameter with a shoulder formed therebetween, wherein the hollow body cylindrical neck portion is inserted sealingly into the outer bore section, and wherein the flat carrier includes a narrow front portion carrying the Hall generator and a wider rear portion with steps being formed therebetween, the flat carrier insertable into the sleeve and the hollow body until the steps abut against the shoulder of the sleeve to positionally locate the Hall generator in the hollow body.

4. An electrical level measuring transducer according to claim 3, including a casting compound inserted into the sleeve inner bore section to securely maintain the flat carrier in position.

* * * * *